April 3, 1951     C. H. LINDENBERG ET AL     2,547,764
METHOD AND APPARATUS FOR BALANCING ROTORS
Filed Sept. 16, 1947     9 Sheets-Sheet 1

INVENTORS
Charles H. Lindenberg.
Theodore Ongaro.
BY
ATTORNEYS

April 3, 1951 C. H. LINDENBERG ET AL 2,547,764
METHOD AND APPARATUS FOR BALANCING ROTORS
Filed Sept. 16, 1947 9 Sheets-Sheet 2

INVENTORS
Charles H. Lindenberg.
Theodore Ongaro.
BY
ATTORNEYS

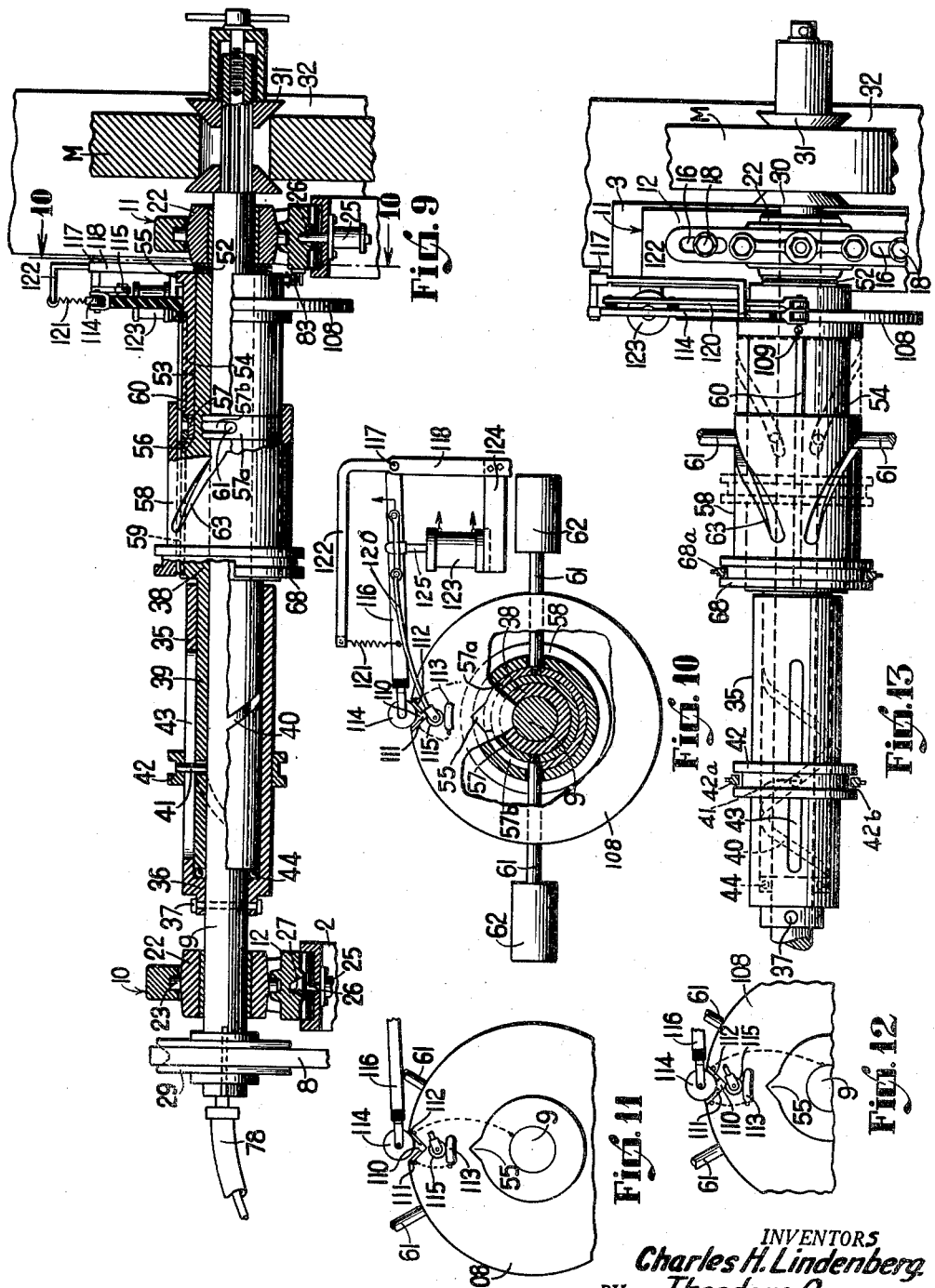

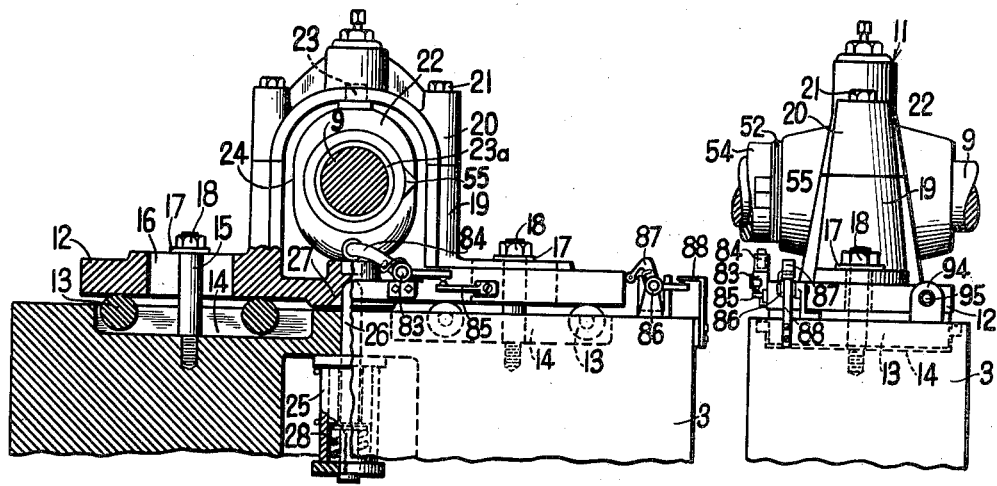

INVENTORS
Charles H. Lindenberg.
BY Theodore Ongaro.
ATTORNEYS

April 3, 1951 C. H. LINDENBERG ET AL 2,547,764
METHOD AND APPARATUS FOR BALANCING ROTORS
Filed Sept. 16, 1947 9 Sheets-Sheet 6
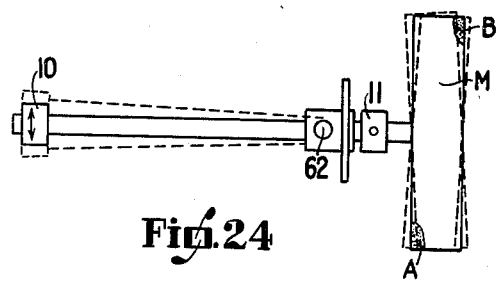
Fig. 24
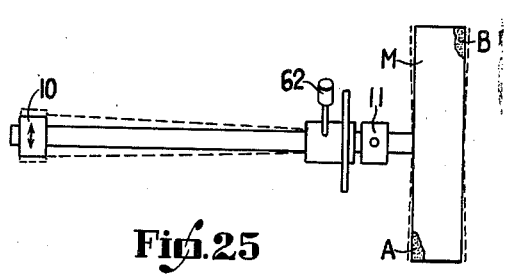
Fig. 25
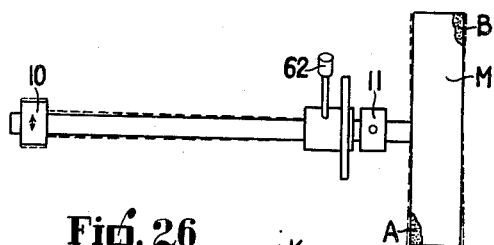
Fig. 26
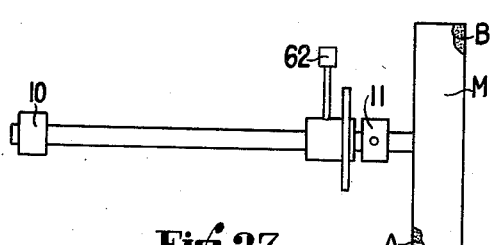
Fig. 27
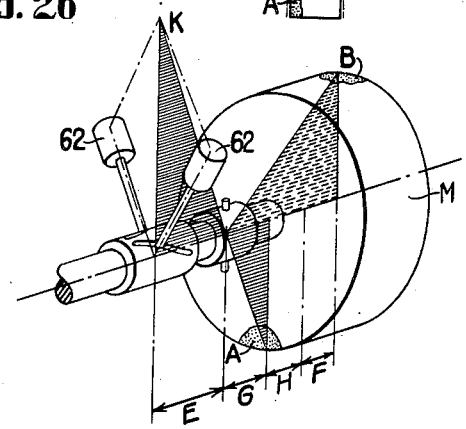
Fig. 28
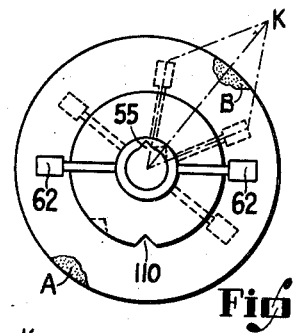
Fig. 30
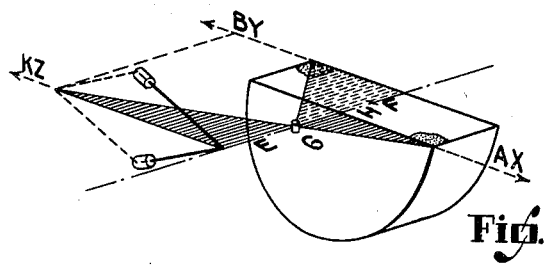
Fig. 29
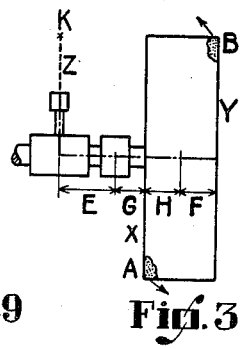
Fig. 31
FORMULA
BY(G+H+F) − A×G = KZE
Fig. 32
INVENTORS
Charles H. Lindenberg.
BY Theodore Ongaro.
Cubett, Molivy & Miller
ATTORNEYS April 3, 1951  C. H. LINDENBERG ET AL  2,547,764
METHOD AND APPARATUS FOR BALANCING ROTORS
Filed Sept. 16, 1947  9 Sheets-Sheet 7

INVENTORS
Charles H. Lindenberg.
BY Theodore Ongaro.
ATTORNEYS

April 3, 1951   C. H. LINDENBERG ET AL   2,547,764
METHOD AND APPARATUS FOR BALANCING ROTORS
Filed Sept. 16, 1947   9 Sheets-Sheet 8
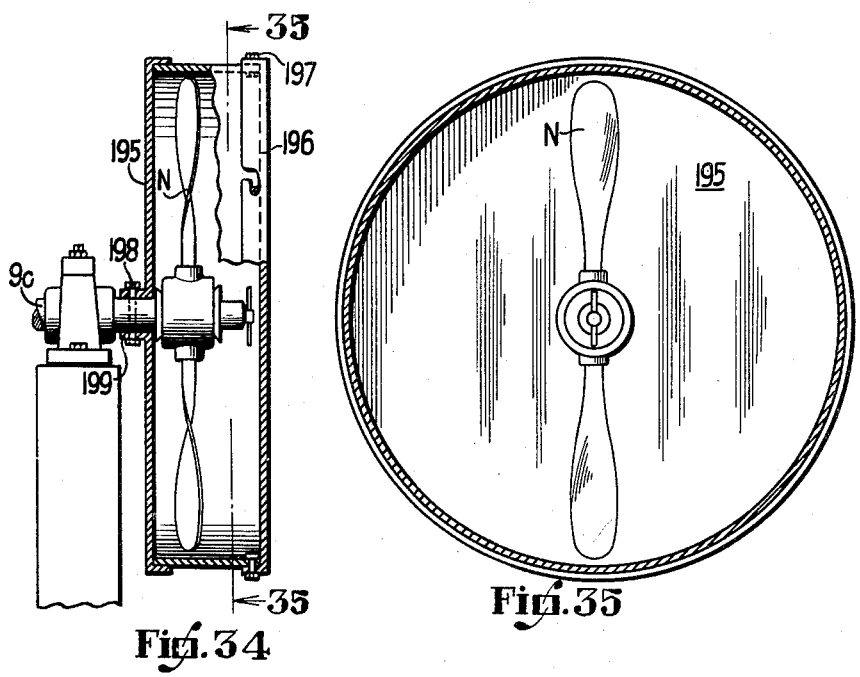
INVENTORS
Charles H. Lindenberg.
BY Theodore Ongaro.
ATTORNEYS April 3, 1951     C. H. LINDENBERG ET AL     2,547,764
METHOD AND APPARATUS FOR BALANCING ROTORS
Filed Sept. 16, 1947     9 Sheets-Sheet 9

INVENTORS
Charles H. Lindenberg.
BY Theodore Ongaro.
ATTORNEYS

Patented Apr. 3, 1951

2,547,764

UNITED STATES PATENT OFFICE 2,547,764

METHOD AND APPARATUS FOR BALANCING ROTORS

Charles H. Lindenberg and Theodore Ongaro, Columbus, Ohio, assignors to Lion Manufacturing Inc., Columbus, Ohio, a corporation of Ohio Application September 16, 1947, Serial No. 774,189

27 Claims. (Cl. 73—66)

Our invention relates to method and apparatus for balancing rotors. It has to do, more particularly, with a method and apparatus for balancing rotors under dynamic conditions simulating actual running conditions.

The rotating parts of many machines, herein referred to as rotors, must be balanced in order to prevent excessive vibrations, especially if the speed of rotation is high. The forces resulting from unbalance in the rotor are of two types, namely, that type which results in radial force, or what might be termed single plane unbalance, and that type which results in axial moments or couples and refers to the unbalanced portions at different planes axially of the rotor.

It is common practice at the present time to attempt to overcome the unbalanced radial force or single plane unbalance by means of static or standing balancing. In this operation, the rotor is supported with its axis horizontally disposed on knife edges or free bearings to permit the heavy side to fall or rotate to the bottom. Then weights are applied to the opposite side of the rotor to counterbalance the heavy side. This method is extremely slow, involves "cut and try" operations and is not accurate for rotors to be used at high speeds. The unbalanced radial force may have a different effect under running conditions than it does under static conditions and this is especially true if the rotor is a body which flexes or is distorted by centrifugal force during rotation.

To attempt to produce dynamic or running balance after the rotor is balanced statically as above, it is customary to use testing machines which support the rotor so that its unbalanced axial moments or couples will produce vibrations when it is rotated under simulated running conditions. These machines usually include electric pickups by means of which an attempt is made to locate the angular position of the unbalanced forces and to estimate, by means of the extent of vibration, the amount of weight causing the unbalance. This method cannot be consistent because in any such system of vibration pickup, there is lag between the actual point of the force causing the unbalance and the instant of reaction in the rotating mass. Since this lag varies with the speed, attempts are made to operate the machine near the "critical" speed of the unbalanced rotor, or speed where the unbalanced forces have their greatest effect, but since this speed is variable and unpredictable, the method becomes a trial and error system at best.

There is no prior art method or machine, with which we are familiar, which is capable of accurately and consistently balancing at all speeds any rotatable body to overcome both single plane unbalance or unbalanced radial force and multiplane unbalance or couples occurring as axial moments.

Prior art machines for balancing purposes have usually been difficult to operate, requiring a highly skilled operator to attempt to determine the location and extent of the unbalance. Furthermore, the extent and location of the unbalance is not definitely indicated, requiring a considerable amount of calculation by the operator.

The main object of our invention is to provide a method and machine for accurately and consistently balancing at all speeds of rotation any body to be rotated in use in such a manner as to overcome both unbalanced radial force and axial moments or, in other words, to overcome those unbalanced conditions which prior art methods attempted to overcome by the usual "static" and "dynamic" balancing.

Another object of our invention is to provide a method and machine as indicated above wherein the rotor is balanced under conditions simulating actual running conditions to overcome both single plane and couple types of unbalance.

Another object of our invention is to provide a balancing machine wherein the rotor is balanced on the machine under conditions simulating running conditions to overcome both types of unbalance by introducing calibrated equal and opposite forces to the unbalanced forces in the rotor while it is being rotated.

Still another object of our invention is to provide a machine of the type indicated in the preceding paragraph wherein the unbalanced condition of the rotor is not only indicated while it is being rotated on the machine but the rotor is actually brought into balance while on the machine and, therefore, the effect of "lag" between the instant of vibration and the indication or pickup of such vibration is eliminated.

A further object of our invention is to provide a machine of the type indicated of such a nature that a rotor mounted thereon can be brought into balance with ease and accuracy, the machine being so simple and easy to operate that a highly skilled operator is not required and no calibration by the operator is required since the location and amount of weight correction necessary to bring the rotor into balance will be definitely indicated.

According to our invention, we rotate the rotor to be balanced under conditions simulating actual running conditions at various speeds. While the rotor is so rotated, it is brought into actual balance by the use of counterbalance weight which introduces calibrated equal and opposite forces to the unbalanced forces in the rotor and overcomes such unbalanced forces.

According to our invention, the rotor is so supported during rotation that the radial force or single plane unbalance force is permitted first to exert its greatest effect on the machine assembly and by proper adjustment of a counterbalance weight on such assembly the rotor is brought into balance under running conditions. This step is different from the prior art wherein the single plane unbalance is tested and an attempt is made to correct is under static conditions. The position of the counterbalance weight, on our machine assembly, will indicate the position and amount of counterweight which should be added to or removed from the rotor to overcome the single plane unbalance. Thus, the rotor is brought into balance to overcome the single plane unbalance under running conditions during which such unbalance will have substantially the same effect as during rotation of the rotor in actual use. This is especially important in the case of a rotor which flexes or becomes distored under centrifugal force although it is also important where the rotor is a rigid body since even then small unbalanced forces which cannot be detected by the static method become apparent at high speeds.

After the rotor is brought into balance, as indicated above, it is so supported that the axial moment or unbalanced couple force will exert its greatest effect on the machine assembly when the rotor is rotated. The same counterbalance weight on the machine assembly is now adjusted to overcome this type of unbalanced force. The proper adjustment of the weight will bring the rotor into balance on the machine assembly under running conditions. The position of this weight will indicate the amount and position of the counterweight to be added to the rotor to overcome this type of unbalance. When such weight is added to the rotor, the rotor will be in exact balance both as to single plane and couple effects.

During both balancing operations, the rotor is actually brought into balance on the machine assembly. Thus, the "lag" effect, previously mentioned, will not be present during either operation. Since the rotor is actually balanced by adjustment of the counterbalance weight, the necessary correction is accurately indicated and located and no calibration by the operator will be necessary.

By the accompanying drawings we have illustrated the principles of our invention and apparatus by which our method can be performed. In these drawings:

Figure 9 is a view partially in section taken generally along line 9—9 of Figure 2.

Figure 10 is a transverse sectional view taken along line 10—10 of Figure 9 and illustrating cam-actuated contacts for controlling the electric circuit which operates indicating mechanism of the machine that shows where the weight correction should be made on the rotor.

Figure 11 is a face view of the mechanism of Figure 10 showing the parts thereof in different positions from Figure 10.

Figure 12 is a similar view illustrating still different positions of the parts.

Figure 13 is a top view of a portion of the mechanism of Figure 9.

Figure 14 is a transverse sectional view taken substantially along line 14—14 of Figure 2 illustrating one of the bearing structures used for supporting the shaft which is adapted to carry the rotors to be balanced.

Figure 15 is a side view of the bearing structure shown in Figure 14.

Figure 16 is a plan view partly broken away of the bearing structure of Figures 14 and 15.

Figure 17 is a perspective view of the bearing structure.

Figure 19:
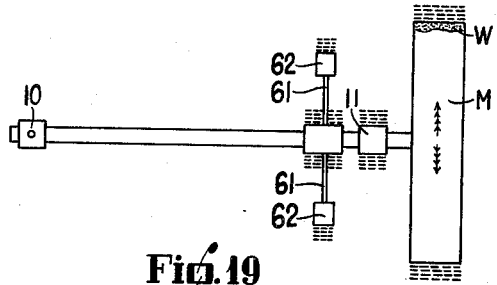
Figure 19 is a diagrammatic view illustrating how the rotor supporting shaft is pivoted for oscillation or vibration about a pivot so located that the single plane unbalance will be effective to produce such vibration in the single plane balancing operation.
Figure 20:
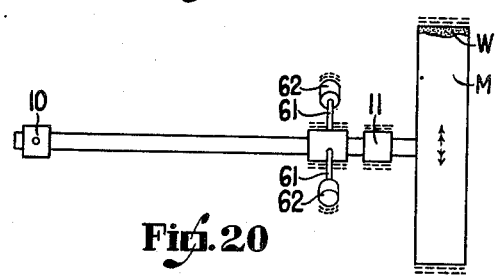
Figure 21:
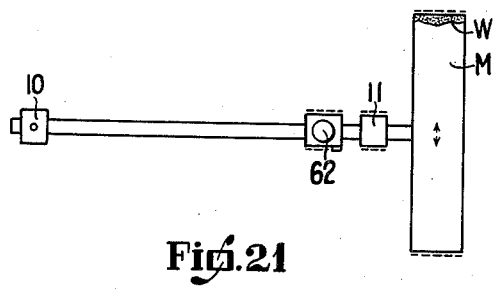
Figure 22:
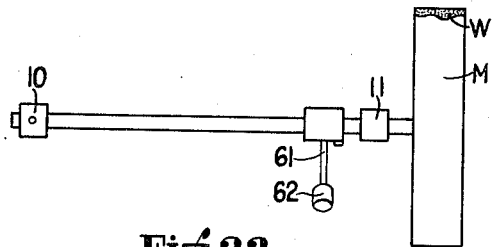

Figures 20 to 22, inclusive, are views similar to Figure 19 but illustrating successive steps in the balancing operation.

Figure 23:
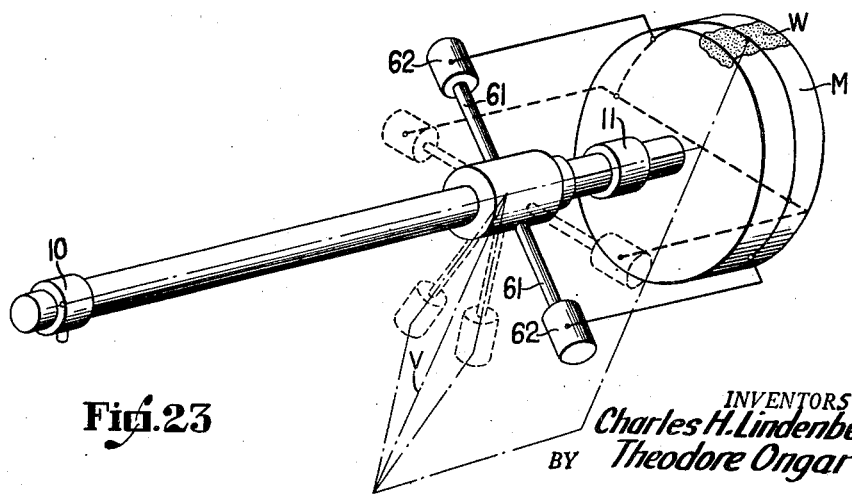

Figure 23 is a diagrammatic view in perspective illustrating the single plane balancing operation.

Figure 24 is a view similar to Figure 19 but showing the rotor supporting shaft pivoted for vibration about a different pivot so that the unbalanced couple effect will be more pronounced preparatory to the couple balancing operation.

Figures 25 to 27, inclusive, are views similar to Figure 24 illustrating successive steps in the couple balancing operation.

Figure 28 is a diagrammatic view in perspective showing the counterbalancing weights associated with a rotor and indicating the principles involved in the couple balancing operation.

Figure 29 is a similar perspective view of a portion of the rotor further illustrating the principles involved in the couple balancing operation.

Figure 30 is a face view of the rotor of Figure 28 showing the counterbalancing weights associated therewith and illustrating diagrammatically how such weights are adjusted in the balancing operation.

Figure 31 is an edge view of the rotor of Figure 30 showing the weights associated therewith.

Figure 32 is a view illustrating the formula involved in the couple balancing operation.

Figure 33:
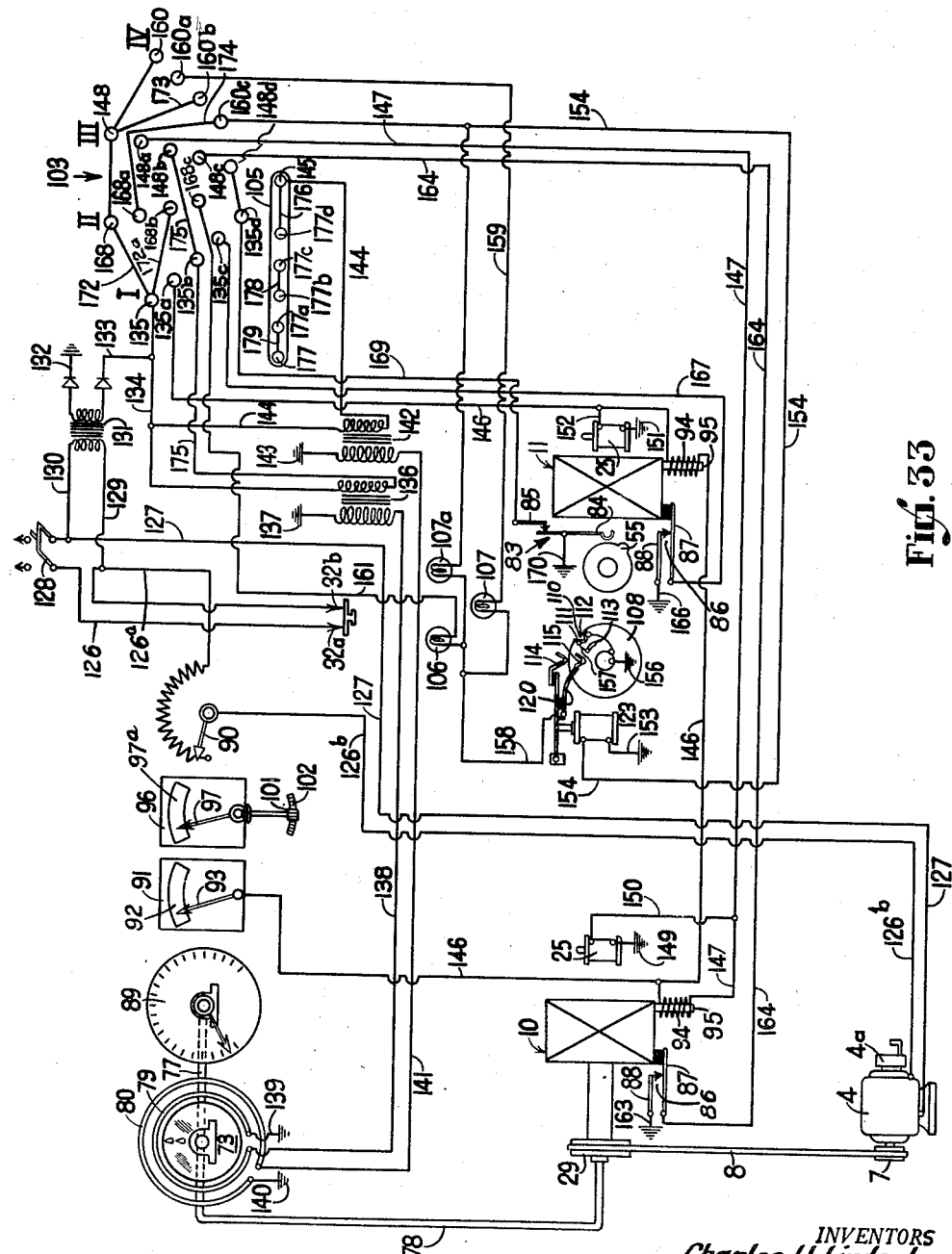

Figure 33 is a schematic view of the operating units of the machine and a diagram of the electric circuit of the machine.

Figure 34 is a view partly in side elevation and partly in vertical section illustrating a rotor of the type affected by air resistance upon rotation, showing it enclosed in a housing mounted on the rotor supporting shaft so that air resistance will be eliminated.

Figure 35 is a vertical sectional view taken along line 35—35 of Figure 34.

Figure 36:
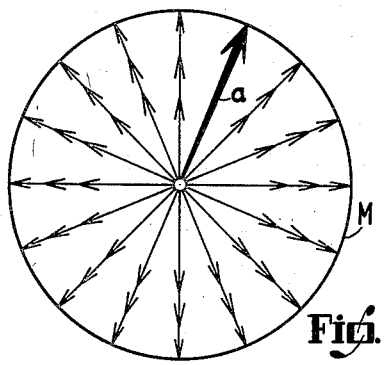

Figure 36 is a force diagram illustrating the effect of unbalanced radial force on a rotor.

Figure 37:
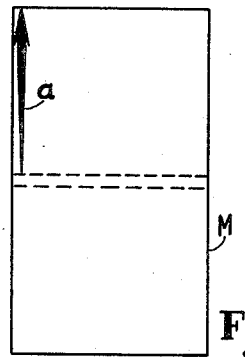

Figure 37 is an edge view of the rotor of Figure 36 illustrating the plane of the force.

Figure 38:
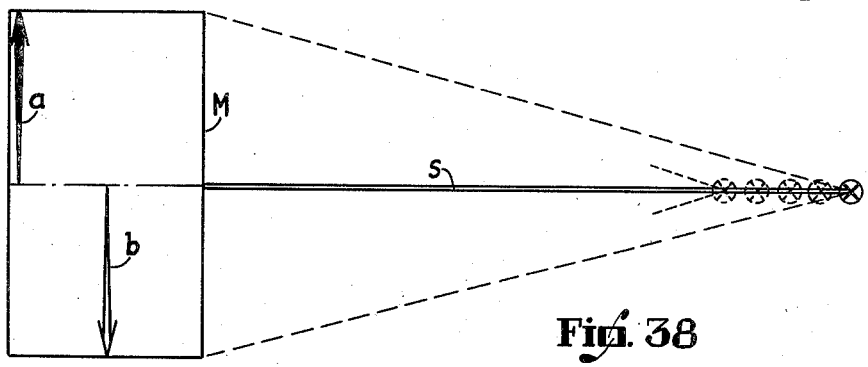

Figure 38 is a diagrammatic view illustrating how the rotor supporting shaft is pivoted so that the unbalanced radial force is effective to cause vibration or oscillation of the shaft and illustrating how the unbalance is overcome.

Figure 39:
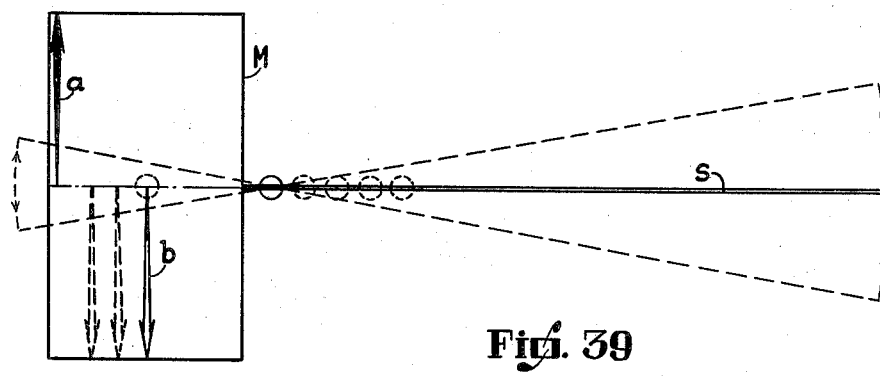

Figure 39 is a view similar to Figure 38 but illustrating how the rotor shaft is pivoted so that the unbalanced axial moments or couple are effective to cause vibration of the shaft.

Figure 40:
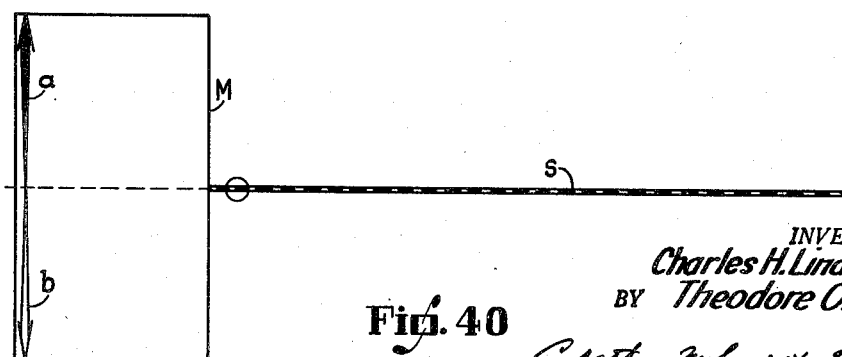

Figure 40 is a similar view but illustrating the rotor brought into true running balance.

Figure 1:
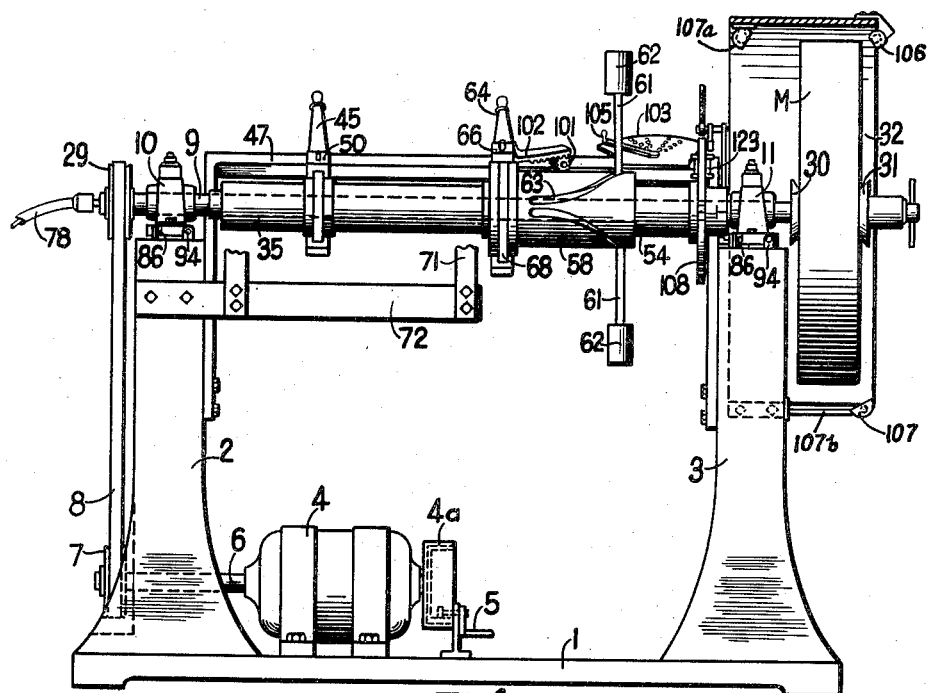
Figure 1 is a side elevational view of a balancing machine constructed in accordance with our invention.
Figure 2:
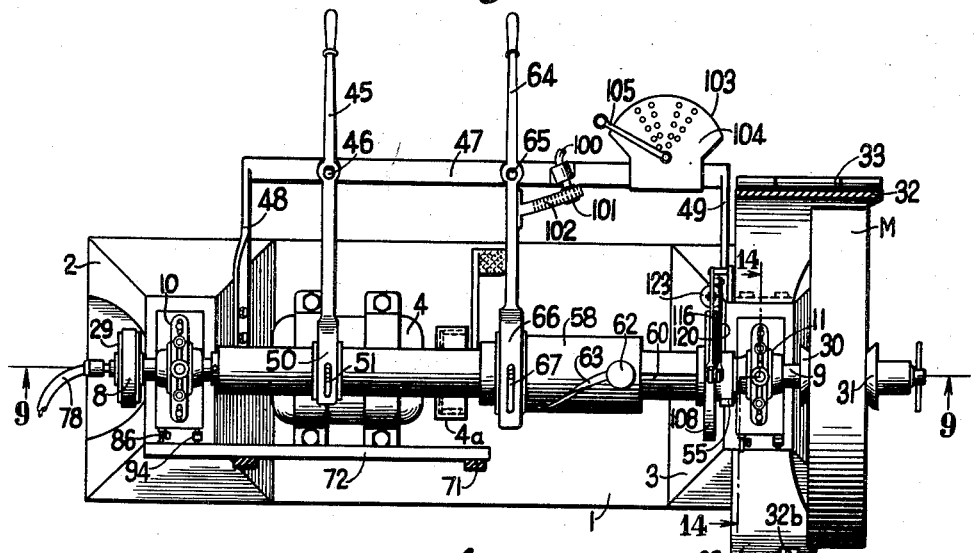
Figure 2 is a plan view of the machine of Figure 1.
Figure 3:
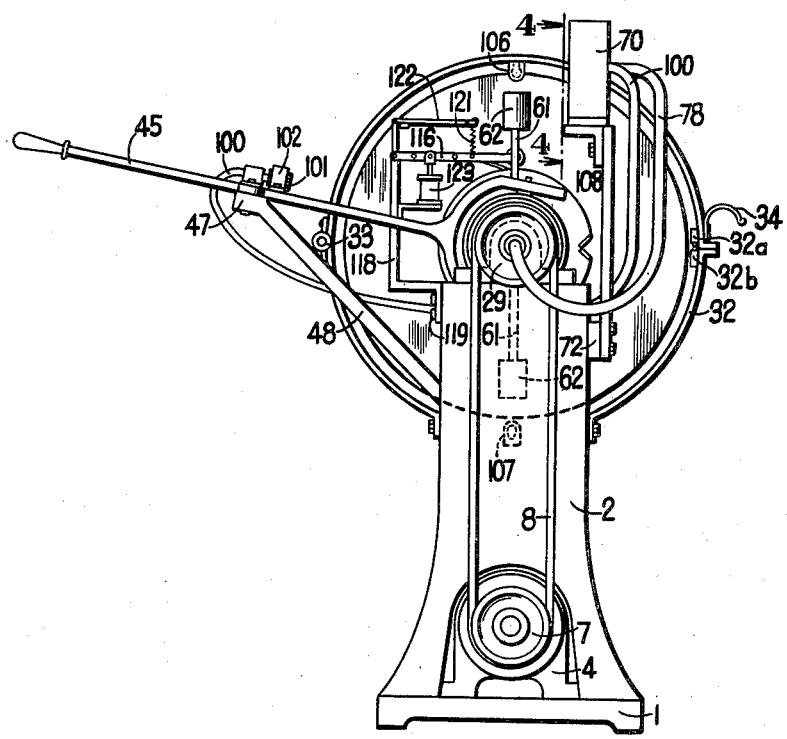
Figure 3 is an end view of the machine of Figures 1 and 2.

With reference to the drawings, in Figures 1, 2 and 3, we have illustrated generally a machine constructed in accordance with our invention and which can be employed for performing our balancing method. The machine comprises a supporting structure in the form of a base 1 having supporting standards 2 and 3 at opposite ends. The base 1 carries a driving motor 4 which has a brake 4a associated therewith that is controlled by means of a foot pedal 5. The motor 4 has a drive shaft 6 which carries a pulley 7 on its outer end that drives a belt 8. The belt 8 is adapted to drive, as will later appear, the rotor supporting shaft 9 which is carried upon the upper ends of the standards 2 and 3.

On the upper end of the standard 2 is a bearing unit 10 while on the upper end of the standard 3 is a bearing unit 11. These two units are identical and a description of one will suffice for both. They serve to confine vibrations of shaft 9, which are produced by unbalanced weight in the rotor to be balanced, to a horizontal plane. The structure of these bearing units is illustrated best in Figures 14 to 17, inclusive. The bearing structure comprises a horizontally disposed supporting plate 12 which is mounted on the upper end of the standard for transverse reciprocatory movement. This plate rests on a plurality of rollers 13 which are disposed transversely of the plate and which are rotatably mounted in the edges of recesses 14 formed in the top of the standard, as shown best in Figure 16. To limit the movement of the plate 12 and to prevent it from being lifted from the standard, a pair of upstanding bolts 15 are threaded into the bottoms of the recesses 14. These bolts 15 extend upwardly through a pair of slots 16 which extend at right angles to the rollers 13. Thus, when the plate 12 is moved transversely of the standard, the bolts 15 permit such movement and normally the bolts will not contact the ends of the slots. Washers 17 are held in place on the upper end of bolts 15 by nuts 18 and extend over the edges of the slots 16 to prevent upward movement of the plate 12.

The lower half 19 of the bearing structure is formed integral with the plate 12 and extends upwardly therefrom. The upper half 20 is secured to the lower half by means of clamping bolts 21 which extend downwardly through aligning sleeves formed in the two halves of the bearing. Within the bearing structure formed by the members 19 and 20, a bearing sleeve 22 is disposed. This bearing sleeve has integral trunnions 23 formed on its upper and lower edges which extend into pivot sockets in members 20 and 19. The sleeve 22 is provided with a bushing 23a which snugly embraces the rotor supporting shaft 9. The sleeve 22 has flattened sides, as indicated at 24 in Figure 14, so that it can oscillate about the axes of pivots 23 without interfering with the bearing sections 19 and 20. Thus, with this bearing structure, when the plate 12 is released, the entire bearing unit can move transversely and at the same time the sleeve 22, which carries the shaft, can oscillate about the axes of trunnions 23.

In order to lock the plate 12 in position centrally of the standard when it is desired to prevent reciprocation thereof, a solenoid unit 25 is mounted within the standard adjacent the upper end thereof. This unit has a plunger 26 projecting upwardly through the top of the standard and which is adapted to cooperate with a funnel-shaped socket 27 formed in the lower surface of plate 12 and centrally thereof. A spring 28 is provided in the solenoid for normally forcing the plunger 26 upwardly into the socket 27. However, current may be supplied to the solenoid to withdraw the plunger 26 from socket 27 and, therefore, release the plate 12 and the bearing structure which it carries for movement transversely of the standard. It will be noted that since the upper end of the pin 26 is rounded and the socket 27 is funnel-shaped, the plate 12 will be exactly centered.

When the machine is being used in the balancing operation, one of the bearing structures will be locked by means of a solenoid while the other will be released. In the locked bearing structure, the sleeve 22 will merely pivot on the trunnions 23. In the unlocked bearing structure, the sleeve will pivot about the trunnions and simultaneously the plate 12 will reciprocate transversely. The bolts 15 are somewhat smaller in diameter than the width of slots 16 so as to permit slight sliding of plate 12 of the unlocked bearing during swinging movement of the shaft on rollers 13 in the direction of the axes thereof so as to prevent a binding action between the two bearing structures.

The end of the shaft 9 adjacent the standard 2 (Figures 1 and 2) extends beyond the standard and carries a pulley 29 around which the belt 8 extends so as to drive the shaft. Since the extent of the swinging movement of this end of the shaft is not very great, regardless of which pivot is locked, the belt 8 will not be displaced from pulley 29 during such swinging movement. The opposite end of the shaft 9 extends through the bearing structure 11 and beyond the standard 3. This end of the shaft is provided with a fixed cone-shaped clamping member 30 and axially movable clamping member 31 between which the rotor is clamped after it is positioned on the shaft. The members 30 and 31 will cooperate with the hub of the rotor to center the rotor and clamp it on the shaft. A guard 32 is preferably associated with the rotor, the lower sections being fastened to the standard 3 and the upper section being hinged to the lower section, as at 33 in Figure 3, such section being provided with a handle 34 by means of which it may be swung upwardly to permit positioning of the rotor on the shaft or removal of it therefrom. A safety switch is provided on the adjacent parts of the upper and lower guard sections and include contacts 32a and 32b (Figure 3) which are separated whenever the guard sections are separated. This switch controls the circuit to motor 4 and, consequently, when the guard is open the rotor cannot be rotated.

Associated with the shaft 9 we provide controllable counterbalanced weights for bringing the rotor into running balance and means for indicating the location of the unbalanced weight in the rotor and for indicating when the rotor is brought into balance by adjustment of the weights. This structure is illustrated best in Figures 9 to 13, inclusive.

It will be noted from Figure 9 that the shaft 9 is provided with a sleeve 35 which surrounds the shaft in spaced relationship thereto but which has an integral collar at its end, adjacent bearing 10, which is keyed by means of a pin 37 to the shaft for rotation therewith. Extending from the collar 36 to a point adjacent the bearing 11 is a sleeve 38 which closely fits the shaft 9. The portion 39 of the sleeve 38 which fits within the sleeve 35 is reduced and is rotatable within the sleeve 35 and relative to shaft 9. This portion 39 is provided with a helical slot 40 with which a pin 41 cooperates, the pin being carried by a collar 42 mounted for axial movement on the outer surface of the sleeve 35. The pin 41 extends through a longitudinal slot 43 formed in the sleeve 35 and, consequently, the collar 42 can move axially of sleeve 35 but cannot rotate independently of such sleeve. It will be apparent that when collar 42 is shifted axially, the sleeve 38 will be rotated by means of pin 41 and helical slot 40. Between the end of sleeve 38 and the collar 36 of sleeve 35 a thrust bearing 44 is provided.

The collar 42 is shifted axially of sleeve 35 by means of a hand lever 45 shown best in Figures 1, 2 and 3. This hand lever is pivoted intermediate its ends, as at 46 (Figure 2), to a support 47 which is supported parallel to the shaft 9 by means of inwardly extending arms 48 and 49 which are bolted, respectively, to the standards 2 and 3. The inner end of the lever 45 carries a yoke 50 which straddles a collar 42a and is connected thereto by pin and slot connections 51. As shown in Figure 13, collar 42a is rotatably mounted on collar 42 by being disposed in groove 42b thereof. It will be obvious that when the lever 45 is swung about its pivot 46, the collar 42 will be moved axially of the sleeve 35. Consequently, the sleeve 38 will be rotated.

The end of the sleeve 38 which is adjacent the bearing 11 is provided with a thrust bearing 52 which is disposed between the sleeve 38 and the sleeve 22 of the bearing 11. Disposed on a reduced portion 53 at this end of sleeve 38 is a cam-carrying sleeve 54. This sleeve 54 is provided with a cam 55 at its extreme end. Between the inner end of sleeve 54 and an enlarged portion 56 of sleeve 38 a pair of weight-carrying collars 57 and 57a are mounted on the portion 53 of sleeve 38 in nested relationship, collar 57 being inside and collar 57a surrounding collar 57. Surrounding the portion 56 and the collar 57a and extending over the sleeve 54 is a weight-adjusting sleeve 58. This sleeve 58 is splined, as at 59, to the portion 56 of sleeve 38 and, as at 60, to the sleeve 54. Thus, it can move axially of these members but will not rotate relative thereto. Each of the collars 57 and 57a is provided with radially extending pin or arm 61 which carries a counterbalance weight 62 (Figure 1) on its outer end. To permit the arms 61 to be in the same plane, which is at right angles to the axis of shaft 9, the pin 61 on inner collar 57 extends outwardly through a slot 57b in outer collar 57a, such slot extending sufficiently to permit the required relative movement of arms 61. Each of the arms 61 extends through a helical slot 63 formed in the sleeve 58. These slots are such that by moving the sleeve 58 axially the weights can be shifted angularly relative to each other. It will be noted that by means of the sleeve 58, the sleeve 54 is connected to the sleeve 38 for rotation therewith.

The sleeve 58 can be moved axially by means of a hand lever 64 (Figure 2) which is similar to the lever 45 and is pivoted by a pivot 65 to the support 47. The yoke 66 formed on the inner end of this lever is connected by a pin and slot connection 67 to a collar 68a rotatably mounted on collar 68 carried on sleeve 54 so as to permit free rotation of the collar 68. It will be apparent that movement of lever 64 will move the sleeve 58 axially and will rotate the collars 57 and 57a (Figure 9) and thereby adjust the weights 62 circumferentially relative to each other towards or away from cam 55 which will be the mid-point between arms 61. Rotation of the sleeve 38 by shifting the collar 42 will cause the sleeve 54 and sleeve 58 to rotate therewith. Thus, the cam 55 will be shifted relative to the shaft 9. However, this adjustment will not disturb the relationship of the cam 55 to the weights 62. This relationship can only be changed by moving the sleeve 58 axially to shift the weights relative to each other and, therefore, relative to the cam 55.

The shaft 9 and associated mechanism serves as the balancing assembly of the machine. For indicating various conditions during the balancing operations with this assembly, we provide indicating mechanism which will now be described.

Figure 4:
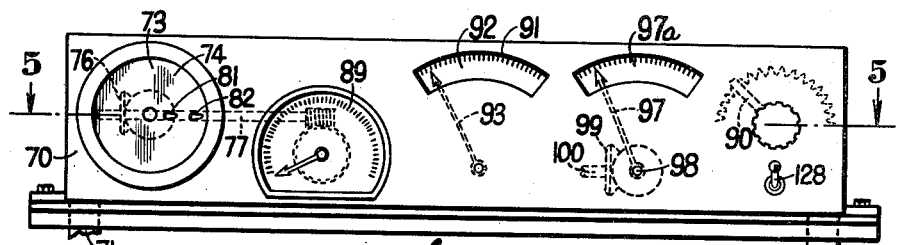
Figure 4 is a view taken substantially along line 4—4 of Figure 3 showing the face of the instrument panel of the machine.
Figure 5:
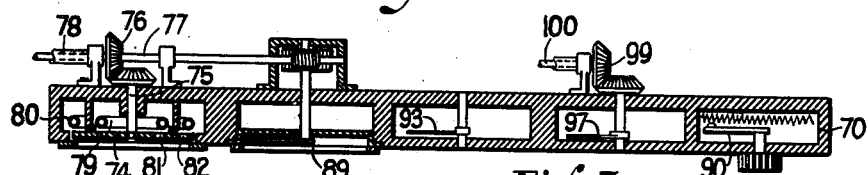
Figure 5 is a sectional view taken along line 5—5 of Figure 4.

The dials of this indicating mechanism are shown best in Figures 4 and 5. They are carried by a panel type housing 70 which is carried by a pair of upstanding bars 71 that are attached at their lower ends to a horizontal bar 72 which has one end secured to the standard 2. It will be noted best from Figure 3 that the housing 70 is supported above the level of the balancing assembly parallel to the shaft 9 and facing towards the side of the machine where the control levers 45 and 64 are located. Thus, as the operator actuates the levers 45 and 64 he can view the instruments carried by the housing 70.

Figures 6, 7, 8:
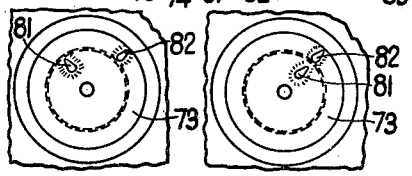
Figure 6 is a face view of the dial which indicates the relative angular positions of the unbalanced force in the rotating rotor and the counterbalance weights of the machine.
Figures 7 and 8 are views similar to Figure 6 but illustrating the dial as showing two different conditions during the balancing operation.

The first instrument shown at the left of Figures 4 and 5 and carried by housing 70 is that indicated by the numeral 73 which will indicate the position of the force center of the counterbalancing weights 62 relative to the shaft 9 and also the position of the excess weight of the rotor, causing the unbalance, relative to the controllable weights. This instrument includes a dial 74 which is driven upon rotation of the shaft 9. The dial shaft 75 is driven by bevel pinions 76 which are driven by a flexible shaft 77, as shown best in Figure 5. This shaft 77 extends through a flexible conduit 78 to the end of shaft 9 (Figures 1, 2 and 3) to which it is suitably coupled. Behind the dial 74 an inner luminous tube 79 and an outer luminous tube 80 are mounted in a fixed position and cooperates, respectively, with the spaced openings 81 and 82 which are in the form of arrows as shown in Figure 4. It will be apparent from the description of the electric circuit, which follows, that suitable pick-ups or electric switches are provided for independently illuminating the two tubes 79 and 80 at the proper instants. The outer tube 80 is controlled by a switch 83 which is associated with the cam 55 as shown best in Figure 17. Upon each rotation of the shaft 9 and, therefore, of the sleeve 54, the cam 55 strikes the pivoted contact arm 84 of the switch 83 which is carried on the upper surface of the standard 3. Upon contact of cam 55 with contact 84, such contact is separated from the fixed contact 85 which controls a circuit in which the contacts 84 and 85 are connected in order to cause flashing of the outer tube 80. The flash of this tube will be visible through the opening 82 in the dial as shown in Figures 6 and 7. Thus, a flash of this tube will occur during each revolution of the shaft 9 and in the same relative position so that it will appear as a continuous light at that particular angular position for indicating the location of the force center of the controllable weights. The inner tube 79 is controlled by pick-up switches 86 each of which is positioned at one edge of the standards 2 or 3 as shown best in Figure 17. Each of the switches 86 comprises a pivoted contact member 87 and an associated contact member 88. When the plate 12 of the associated bearing structure moves outwardly adjacent switch 86, it swings contact 87 about its pivot and away from contact 88. Separation of these contacts will control the circuit in which they are connected in order to cause flashing of the inner tube 79. The flash of this tube will be visible through the opening 81, as shown in Figures 6 and 7, and will occur during each revolution of the shaft 9 as long as the rotor carried by the shaft is out of balance. Thus, there will appear a constant light at a fixed angular position on the dial 74 indicating the angular position of the effect of the unbalanced weight in the rotor. Furthermore, the comparison of the position of the unbalanced weight of the rotor relative to the position of the force center of the controllable weight 62 will be indicated on the dial as shown in Figure 6. Other conditions which occur during the balancing operation will be indicated by the dial, as illustrated in Figures 7 and 8 and which will be referred to more in detail hereinafter.

The flexible shaft 77 extends to a second instrument 89 on the panel 70 which is a tachometer. The speed of rotation of the motor 4 may be changed by means of a rheostat 90 which is preferably carried by the panel 70. The speed of rotation of the shaft can be observed from the tachometer 89 which is desirable since it should be rotated at various speeds during the balancing operation.

The degree of unbalance in the rotor carried by the shaft 9 or, in other words, the degree of vibration produced by such unbalance is indicated by a third instrument 91 carried by the panel 70. This instrument comprises a dial 92 and a pointer 93 which is controlled by variations in current in an electric circuit in which it is connected in a manner to be described hereinafter. Variations in current in such circuit are produced by an adjustable core inductor 94 which is illustrated in Figure 17 and is associated with the plate 12. One of these inductors 94 is positioned on each of the standards 2 and 3. It is provided with a movable core 95 which is engaged by the plate 12 as it moves towards the edge of the standard adjacent which the inductor 94 is positioned. The extent of movement of the core 95 is indicated by movement of the pointer 93. Thus, the extent of movement of the plate 12 in one direction will be indicated.

A fourth instrument 96 is provided on the panel 70 for indicating the amount of weight required at any given radius which is calibrated from the angular positions of the weights 62. This instrument comprises a dial 97a and an associated pointer 97. The pointer 97 is carried by a shaft 98 which is rotated by means of bevel gears 99. These gears 99 are driven by a flexible shaft 100. The shaft 100 extends to a point adjacent the control lever 64 (Figure 2) and at this end carries a pinion 101. This pinion 101 meshes with a rack 102 carried by an arm secured to the lever 64. It will be apparent that swinging of lever 64 about the pivot 65 will result in rotation of shaft 100 and consequently movement of the pointer 97. Since movement of the lever 64 moves sleeve 54 and thereby adjusts the weights 62, the dial 97a can be calibrated to indicate, in cooperation with pointer 97, the effective weight produced by weights 62.

The main control switch 103 for controlling the electric circuit of the machine is carried by the support 47 (Figure 2) adjacent the control lever 64. This switch comprises a contact-carrying plate 104 and a movable lever 105.

In order to indicate on the rotor the point where the weight correction should be applied, we provide means for projecting narrow light beams on such point after each balancing operation has been completed. Two lights 106 and 107a are provided for this purpose and are carried within the upper section of the rotor guard 32 at opposite edges thereof and are adapted to project beams on the periphery and adjacent side surfaces of the rotor. These light beams will indicate where the weights are to be applied to bring the rotor into single plane balance. For indicating where the weights are to be applied on the rotor to overcome couple unbalance, an additional light 107, for use with light 107a, is mounted on the arm 107b carried by standard 3 180° from light 107a but on the opposite side of the rotor. The lights 107 and 107a are adapted to project beams on the periphery of the rotor 180° apart and on adjacent but opposite side surfaces. As will be explained later, independent circuits are provided for controlling the lights 106 and 107a and the lights 107 and 107a.

For controlling the circuits to these lights 106, 107 and 107a, we provide the mechanism which is illustrated best in Figures 10, 11 and 12. This mechanism includes a disc 108 of insulating material which is carried by the sleeve 54 disposed on the shaft 9. As shown in Figure 9, the disc 108 is non-rotatably secured to sleeve 54 by a screw 109. This disc 108 is provided with a V-shaped notch 110 on its peripheral edge which is always in radical alignment with the cam portion 55. The opposite sides of this notch carried contact plates 111 and 112. The contact 112 is grounded while the contact 111 is connected to a third contact 113 carried on the side of the disc. At the proper instant, a contact roller 114 will enter the notch 110 (Figure 12) and make the circuit between contacts 111 and 112. At the same time, a contact roller 115 will engage the contact 113 and make the circuit at this point. These various contacts, as will later appear, are connected in the circuits for the lights 106, 107 and 107a.

The contact roller 114 is carried on the outer end of an arm 116 of insulating material which is disposed substantially tangential to the disc 108. This arm 116 is pivoted at its opposite end, as at 117, to an upstanding support 118. This support 118 is mounted on the upper end of the standard 3 by means of the bolts 119 (Figure 3). The contact roller 115 is carried by a flexible arm 120 made of conducting material. This arm 120 is resilient and normally extends downwardly. It is attached to the arm 116 and is in diverging relationship thereto. Normally the arm 116 and the associated arm 120 are lifted upwardly by means of a spring 121 attached to the arm 116 and to a superimposed horizontal arm 122 forming a part of the support 118. However, a solenoid 123 is provided for pulling the arm 116 downwardly when the solenoid is energized. This solenoid is supported below the arm 116 by a supporting bracket 124 which is attached to the upstanding support 118. The upper end of the core pin 125 of the solenoid is pivotally connected to the arm 116.

Normally the disc 108 will rotate with the shaft 9 and associated parts without the rollers 114 and 115 making contact with their respective contacts carried by the disc 108. However, as will later appear, when the balancing operation is completed, the solenoid 123 will be energized pulling the arm 116 and associated arm 120 downwardly. This will cause the roller 114 to contact with the peripheral edge of the disc 108. If the entire balancing assembly including the rotor carried thereby is now rotated manually, the roller 114 will eventually enter into the notch 110 and at the same time the roller 115 will engage the cam type contact 113. This will complete the circuit to either the lights 106 and 107a or the lights 107 and 107a which will project beams on the rotor to indicate where the weight correction should be made.

In Figure 33, we have illustrated the electric circuit of our machine. The main lines 126 and 127 lead from a suitable source of power and are controlled by a switch 128 which is preferably located on panel 70 (Figure 4). The line 126 is connected to the rheostat 90 by line 126a and a line 126b leads from the rheostat to the motor 4 while the line 127 is connected directly to the motor. Connected in series in the line 126 are the contacts 32a and 32b of the safety switch associated with the rotor guard 32. Connected in parallel with the lines 126 and 127 by the lines 129 and 130 is a transformer 131, the secondary of which is provided with a ground 132 and with a positive 133 which is connected to a line 134. The line 134 is connected at one end to contact 135 of group I of contacts of the main control switch 103. It will be noted that this switch is provided with separate groups, I, II, III and IV of contacts, which are carried by plate 104 (Figure 2), and that the control lever 105 may be selectively moved into association with any one of these groups. The line 134 leads to the primary of a transformer 136 and then to the contact 135b of switch 103. The secondary of transformer 136 is provided with a ground 137 and is connected by a line 138 to the tube 79 of instrument 73 which is provided with a ground 139. The other tube 80 is provided with a ground 140 and with a line 141 which leads to the secondary of a transformer 142 which is provided with a ground 143. The primary of this transformer is connected in a line 144 which is connected to line 134 and to terminal 145 at the pivoted end of lever 105. A line 146 leads from the instrument 91, through inductor 94, associated with bearing 11, to the contact 135a of group I of the switch contacts. The inductor 94, associated with bearing 10, is interposed in a line 147 which is connected to line 146 and which leads to a contact 148a of group III of contacts of switch 103. The locking solenoid 25, associated with bearing 10, is provided with a ground 149 and with a line 150 which is connected to line 147. The locking solenoid 25, associated with bearing 11, is provided with a ground 151 and with a line 152 which connects it to line 146. The solenoid 123 which controls the circuits for the lights 106, 107 and 107a is provided with a ground 153 and with a line 154 which leads to contact 160c of group IV of the contacts of switch 103. The arm 116 associated with solenoid 123 is of insulating material, as previously indicated, and carries contact 114 which cooperates with contacts 111 and 112. Contact 112 is provided with a ground 156 while contact 111 is connected by wire 157 to cam contact 113. Arm 120, carrying contact 115, is connected by wire 158 to the wire 154. In this line 158 the light 107a is interposed. The light 107 is interposed in a branch line 159 which leads from line 158 to contact 160a of group IV of the switch contacts. The light 106 is interposed in a line 161 which leads from the line 158 to a contact 168c of group II of the switch contacts. The contact 88 of switch 86, associated with bearing 10, is provided with a ground 163 while the contact 87 thereof is connected by line 164 to contact 148c of switch 103. Similarly, the contact 88 of switch 86, associated with bearing 11, is provided with a ground 166 and the contact 87 thereof is connected by a line 167 to a contact 135c of group I of the contacts of switch 103. The contact 85 of switch 83, associated with cam 55, is connected by wire 169 to contact 135d and contact 148d of main control switch 103. The contact arm 84 is provided with a ground 170. In the switch 103 the contacts 160, 148, 168, 135 and 168b are connected together in series by a wire 172. Contact 135 is connected to contact 168b by wire 172a. The contact 148 is connected to contact 160b by wire 173. The contacts 168a and 160c are connected together by a line 174. The contact 135b is connected to contact 148b by a wire 175, which is also connected to the primary of transformer 136. The lever 105 of switch 103 has its contact 145 connected by wire 176 to contact 177d. The contacts 177c and 177b, carried by the lever, are connected together by wire 178 while the contacts 177a and 177 thereof are connected together by wire 179.

Whenever switch 128 is closed, the circuit to the motor 4 is completed, provided the rotor guard 32 is in position and the contacts 32a and 32b of the safety switch associated therewith are engaged. The speed of rotation of the motor can be varied by adjusting the rheostat 90 and it can be completely stopped by such adjustment. With the lever 105 of switch 103 in the position shown in Figure 33, the circuits to all the other electrically operated parts of the machine are broken. Assuming that lever 105 is moved into contact with group I of the contacts of switch 103, which will be the position it occupies in the single plane balancing operation, the circuits, in addition to the motor circuit, will be made as follows: From main lines 126 and 127, through lines 129 and 130 to transformer 131 grounded by line 132, through lines 133 and 134 to contact 135, contacts 177, wire 179, contact 177a, contact 135a, wire 146, to locking solenoid 25 associated with bearing 11 and grounded at 151, so as to engage such solenoid and unlock this bearing to permit oscillation or vibration of the right-hand end (on the operator's left) of shaft 9. Current also continues on through inductor 94 associated with bearing 11, being varied by the position of core 95, through line 146 to instrument 91 which will indicate the extent of vibration of the plate 12 of bearing 11. The contact 87 of switch 86, which is associated with bearing 11, will be intermittently separated from grounded contact 88, if the shaft is vibrating. The circuit from contact 87 will continue through wire 167 to contact 135c, contact 177c, wire 178, contact 177b, contact 135b, wire 175 to transformer 136 grounded at 137, and then through line 138 to inner light tube 79, of instrument 73, which is grounded at 139. Thus, tube 79 will be illuminated at those intervals when the contacts 87 and 88 of the switch 86 are separated. Since the associated unlocking solenoid 25 is energized the plate 12 of the bearing 11 is unlocked and reciprocation of such plate is permitted so that the switch 86 is intermittently actuated to flash the tube light 79. Current will also flow from line 134, through line 144, through transformer 142 to the outer light tube 80 of instrument 73 and then into ground 140. The circuit to this tube 80 will be intermittently broken by actuation of switch 83 by means of cam 55 which intermittently separates grounded contacts 84 and contact 85 thereof, contact 85 being connected by wire 169 to contact 135d, which engages contact 177d, of lever 105, that is connected by wire 176 to terminal 145 to which wire 144 is also connected. Thus, with lever 105 in association with group I of the contacts of switch 103, the solenoid 25, switch 86, inductor 94 and switch 83, all of which are associated with bearing 11, are connected in the circuit. These will actuate the instruments 73 and 91, the instrument 89 being actuated by a direct drive from the motor 4. Solenoid 123 and the lights 106, 107 and 107a will not receive current with lever 105 in this position. The instrument 96, as previously indicated, will be actuated by movement of control lever 64 in adjusting the weights 62.

When lever 105 is moved into association with group II of the contacts, which will be the position it occupies after the rotor has been brought into single plane running balance, so as to energize lights 106 and 107a which will indicate where the weight correction is to be made, the circuits will be as follows: From main lines 126 and 127, through lines 129 and 130 to transformer 131, through lines 133 and 134 to contact 135, and through wires 172a to contacts 168 and 168b. Contact 168 is engaged with contact 177 and the current will flow through wire 179, contact 177a which is engaged with contact 168a, wire 174, wire 154 to solenoid 123 which will be energized and will pull arm 116 down so that roller contact 114 will contact disc 108. If disc 108 is rotated sufficiently, by rotating the rotor assembly, contact 114 enters notch 110 and contact 115 strikes contact 113, thereby completing the circuit from line 158 to ground 156 and resulting in lighting bulb 107a and also in lighting bulb 106 which is connected to line 161 that runs to contact 168c. Contact 168c is in engagement with contact 177c which is connected by wire 178 to contact 177b that is engaged with contact 168b, which is connected to the main line, as previously described. Thus, in this position of lever 105, only the circuits for bulbs 106 and 107a and for solenoid 123 are energized.

When lever 105 is moved into association with group III of the contacts, which will be the position it occupies in the couple balancing operation, the circuits will be made as follows: From main lines 126 and 127, through lines 129 and 130 to transformer 131, through lines 133 and 134 to contact 135 and through wire 172 to contact 148 which is in engagement with contact 177 that is connected by wire 179 to contact 177a which is in engagement with contact 148a that is connected to line 147. The current passes through line 147 to inductor 94, associated with bearing 10, which is connected to line 146 that leads to extent of vibration instrument 91. Line 150, which leads to grounded unlocking solenoid 25, associated with bearing 10, also receives current from line 147 so that the plate 12 of this bearing will be unlocked and will be permitted to reciprocate, if the rotor is out of balance. The contact 87 of switch 86, which is associated with bearing 10, will be intermittently separated from grounded contact 88, if the plate 12 of the bearing is reciprocating. The circuit from contact 87 will continue through line 164 to contact 148c that engages contact 177c, connected by wire 178 to contact 177b which is in engagement with contact 148b. Contact 148b is connected by line 175 to the primary of transformer 136, the secondary of which is connected by line 138 to the grounded inner light tube 79 of instrument 73. Thus, tube 79 will be illuminated at those intervals when the contacts 87 and 88 of the switch 86 are separated. Since the associated unlocking solenoid 25 is energized the plate 12 of bearing 10 is unlocked and reciprocation of such plate is permitted so that the switch 86 is intermittently actuated to flash the tube light 79. Current will also flow from line 134, through line 144 to the transformer 142, line 141 to the outer light tube 80 and then into ground 140. The circuit to this tube 80 will be intermittently broken by means of cam 55 actuating switch 83 which is connected to line 169 that leads to contact 135 and then to contact 148d which is in engagement with contact 177d that is connected by wire 176 to terminal 145 which is connected to line 144. Thus, with lever 105 in association with group III of the contacts of switch 103, the solenoid 25, switch 86, and inductor 94, all of which are associated with bearing 10, are connected in the circuit. Switch 83 is also connected in the circuit. These will actuate the instruments 73 and 91. Solenoid 123 and the lights 106, 107 and 107a will not receive current with lever 105 in this position III.

When lever 105 is moved into association with group IV of the contacts, which will be the position it occupies after the unbalanced couple force has been overcome so as to energize lights 107 and 107a which will indicate where the weight correction is to be made, the circuits will be as follows: From main lines 126 and 127, through lines 129 and 130 to transformer 131, through lines 133 and 134 to contact 135 and through wires 172 and 173 to contacts 160 and 160b. Contact 160 is in engagement with contact 177 and the current will flow through wire 179, contact 177a, which is in engagement with contact 160a, wire 159 and wire 158 to contact arm 120, associated with cam 108, which cam when properly rotated, as previously indicated, will ground the circuits in which the bulbs 107 and 107a are connected. This circuit also includes wire 154 that connects to solenoid 123 which will be energized since line 154 connects to contact 160c that is in engagement with contact 177c which is connected by wire 178 to contact 177b that is in engagement with contact 160b which is connected to the source of current as previously indicated. Thus, in this position of lever 105, only the circuits for bulbs 107 and 107a and for solenoid 123 are energized, the circuit for the bulbs being completed after cam disc 108 is rotated to ground such circuits, in the manner previously described.

In Figures 36 to 40, inclusive, we have provided several diagrams which illustrate the theories relating to unbalanced forces in a rotor and the manner in which our method and machine is used to balance the rotor. Rotors may, as shown in Figures 36 and 37, be out of balance because of unbalanced radial force or, in other words, because the rotor is heavier in one radial direction than it is in an opposite radial direction as shown by the arrow a in Figures 36 and 37. This unbalance may be in any plane at right angles to the axis and along such axis, it being shown adjacent the left-hand side in Figure 37, although in the initial balancing operation the rotor is considered as being a single plane. This is common in "static" balancing where the only object is to bring the center of gravity of the rotor into coincidence with the axis thereof. However, we accomplish this under running conditions at various speeds and, therefore, obtain greater accuracy. In this balancing operation, the rotor M is mounted preferably on one end of a shaft s, as shown in Figure 38, which is preferably pivoted for oscillation about a pivot ⊗ which is located adjacent the extreme opposite end of the shaft. Unbalanced radial force in the rotor will cause oscillation of the free end of shaft s about pivot ⊗, if the rotor is rotated. The shaft will tend to oscillate in a cone-shape path, as shown by dash lines in Figure 38, if the pivot ⊗ is universal, with its apex at ⊗ and the further away from pivot ⊗, the rotor is located, the more effective will be the unbalanced weight in the rotor in oscillating the shaft. However, the pivot ⊗ may be located at various distances from the rotor, as indicated by the ⊗'s in Figure 38. To overcome this unbalanced condition, we apply an equal and opposite radial force, as indicated by the arrow b, under running conditions of the rotor and this will stop oscillation or vibration of the shaft. The opposite force b is applied evenly distributed across the width of the rotor.

Although the rotor is thus balanced insofar as radial force is concerned, if the forces a and b are not in the same radial plane, there will be a couple or axial moment unbalance. Therefore, to overcome this couple unbalance, the shaft s is pivoted for oscillation or vibration about the pivot O which is preferably located as close as possible to the center of gravity of the rotor, as shown in Figure 39, and much closer than the pivot ⊗. The unbalanced couple or axial moments will cause gyration of both ends of the shaft s about the pivot O if it is a universal pivot and if the rotor is rotated, such ends describing cone-shape paths, as indicated by dotted lines in Figure 39, with their apexes at the pivot O. Although, it is preferred that the pivot O be close to the center of gravity of rotor M, it may be located at different distances therefrom in either direction as indicated by the positions of the several O's in Figure 39. To stop oscillation or, in other words, to bring the rotor into balance, it is necessary to bring the force b in the same plane as force a, as indicated by a comparison of Figures 39 and 40.

Figure 18:
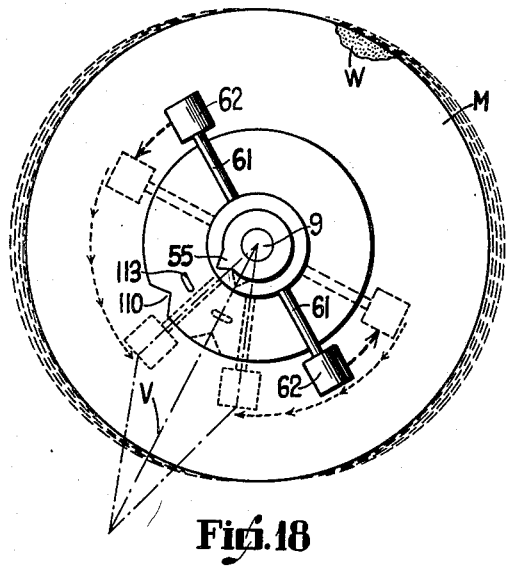
Figure 18 is a diagrammatic view illustrating the counterbalance weights associated with the rotor and the adjustment of such weights to bring the rotor into balance to overcome single plane unbalance.

The machine which we have described, will bring the rotor M into balance in accordance with the above-discussed principles. The rotor M will be mounted on the shaft 9 by means of the cone-shape clamping members 30 and 31. The weights 62 are set in neutral position (180 degrees apart), as illustrated in Figure 18, which is accomplished by swinging the hand lever 64 (Figure 2), the position of the weights being indicated by instrument 96 (Figure 4). The lever 105 of main control switch 103 is moved to position I (Figure 33). This will unlock the bearing 11 without disturbing bearing 10. This also connects pickup switch 86, and inductor 94, associated with bearing 11, and cam switch 83 in the circuit. The motor is started by means of switch 128, provided rotor guard 32 is closed, so as to drive the shaft 9. If the rotor is out of balance, the conditions illustrated in Figures 36 to 38 will be present, except that vibration or oscillation of shaft 9 will be confined to a horizontal plane. It will be noted from Figure 18 that the weights 62 will each be spaced 90 degrees from the cam 55 and that notch 110 in disc 108 is in radial alignment with the cam. As rotation starts cam 55 actuates the switch 83 which flashes the outer light tube 80 of instrument 73, indicating the angular position of the force center of the weights 62 relative to shaft 9. As previously indicated, this flash will appear, as shown in Figures 6 and 7, as a continuous light through opening 82 of rotating dial 74 at that particular angular position. Speed is gradually increased, it being indicated by instrument 89, until oscillation or vibration of shaft 9 about bearing 10, as shown in Figure 19, occurs which will be picked up by switch 86, associated with bearing 11, and which will be indicated by flashing the inner light tube 79 which will appear as a continuous light through opening 81 at a particular angular position. This shows the position of the excess weight in the rotor M relative to the force center of the weights 62. The degree of unbalance is indicated by the instrument 91 which is actuated by inductor 94 that is associated with bearing 11. In Figures 18 to 23, the unbalanced weight in the rotor M is indicated at W.

The instrument 73 now shows a flash at some angular position in the rotating dial 74 through inner opening 81 indicating the location of the unbalanced weight W in rotor M relative to the force center of weights 62 which is indicated by a flash appearing at some angular position in the rotating dial 74 through outer opening 82. The entire weight assembly, without disturbing the relative positions of weights 62, as indicated by dash lines in Figures 18 and 23, is now rotated around the shaft 9 by operating control lever 45. This brings the cam 55 in diametrical alignment with the excess weight W in the rotor and this condition will be indicated, as shown in Figure 7, when the two flashes on instrument 73 appear to be in radial alignment. The vector V of force produced by the weights 62 is now 180 degrees from the unbalanced weight W in rotor M. As indicated by dotted lines in Figures 18 and 23, the weights 62, are now moved angularly relative to each other from their original position (180 degrees apart) towards each other in the example shown, by operating the control lever 64, producing the vector V of forces along the center line of cam 55. This weight force is increased by moving the weights towards each other, and as it is so increased the degree of vibration of the shaft will decrease as indicated by a comparison of Figures 19, 20 and 21, until oscillation of the shaft ceases (Figure 22) which will be indicated by instrument 91 (Figure 4). At this time, the inner flash on instrument 73 (Figure 8) will not appear.

The circuit to the motor 4 is broken by moving lever 90 of the rheostat and rotation of shaft 9 can now be stopped by using brake 4a. The lever 105 of switch 103 is now swung into position II. As previously indicated, in this position, the solenoid 123 will be energized and the circuits to lights 106 and 107a will be so set up that if the shaft and rotor are rotated manually until contact roller 114 of arm 116 enters notch 110 of disc 108, the circuits to the lights 106 and 107a are completed so that they cast radially disposed lines of light on opposite sides of the rotor M and a transverse line of light on the periphery thereof, indicating exactly where the weights should be applied to the rotor to bring it into single plane balance. The exact amount of weight to be added (or removed) is shown on the dial of indicator 96 which may be calibrated in ounce-inches for the particular radial position of the weights. The exact amount of weight is now added to the exact angular point indicated (or removed from a diametrically opposed point) and is preferably evenly distributed between the planes or side surfaces of the rotor. The rotor will now be in single plane balance.

With single plane balancing of the rotor thus accomplished, the next step will be to neutralize the unbalanced couple in the rotor. The weights 62 are again set in neutral position (180 degrees apart), as illustrated by full lines in Figure 30, by means of hand lever 64 and as indicated by instrument 96. The lever 105 of main contact switch 103 is now moved to position III. This will unlock the bearing 10 and permit locking of bearing 11 and also connects pickup switch 86 and inductor 94, associated with bearing 10, and cam switch 83 in the circuit. The motor is started by means of lever 90, provided rotor guard 32 is closed, so as to drive the shaft 9. If an unbalanced couple is present, for example the unbalanced weights A and B which in this example are at opposite sides of the rotor, but may be at different planes within the rotor, the conditions illustrated in Figures 39 and 40 will be present, except that vibration or oscillation of shaft 9 will again be confined to a horizontal plane. Because the rotor has previously been brought into single plane balance it will be known that the couple weights or forces A and B are 180° apart. As rotation of shaft 9 starts, the cam 55 will actuate switch 83, producing the outer flash on instrument 73, indicating the angular position of the force center of the weights 62 relative to shaft 9. Speed is gradually increased and oscillation of shaft 9 about bearing 11, as shown in Figure 24, occurs and will be picked up by the switch 86 associated with bearing 10 which will produce the inner flash on instrument 73. The degree of unbalance will be indicated by instrument 91 actuated by pickup 94 associated with bearing 10. The instrument 73 now shows a flash through outer window 82 at some angular position in the rotating dial 74 indicating the angular location of the force vector K (Figures 28 to 31) relative to the force vector produced by the unbalanced couple in rotor M which is indicated by the flash in the inner window 81.

The entire weight assembly, without disturbing the relative positions of weights 62, as indicated by dash lines in Figure 30, is now rotated around the shaft 9 by means of lever 45. This brings the cam 55 in diametrical alignment with the vector K and this condition will be indicated, as shown in Figure 7, when the two flashes on instrument 73 appear to be in radial alignment. The vector K of force produced by weights 62 is now in the same diametrical plane as the couple A and B in the rotor M, as shown best in Figure 28. As indicated by dotted lines in Figure 30, the weights 62 are now moved angularly from their original position (180 degrees apart) towards each other in the example shown, by means of lever 64, and the vector K will still be along the center line of cam 55. This weight force is increased by moving the weights towards each other, and as it is so increased the degree of vibration of the shaft will decrease as indicated by a comparison of Figures 24 to 26, until oscillation of the shaft ceases (Figure 27) which will be indicated by instrument 91 (Figure 4) and also instrument 73 as shown in Figure 8 since the inner flash will not appear.

The motor 4 is now de-energized by lever 90 and rotation of the shaft can be stopped by using brake 4a. The lever 105 of switch 103 is now swung into position IV. As previously indicated, in this position, the solenoid 123 will be energized and the circuits to the lights 107 and 107a will be set up so that if the shaft and rotor are rotated manually until contact roller 114 enters notch 110 of disc 108, the lights 107 and 107a will go on and will project radial lines of light on opposite sides of the rotor, 180 degrees apart and on opposite sides to the location of the forces A and B. The exact amount of weight to be added at each side is one-half the amount shown on the dial of indicator 96. After this weight correction is made, the rotor will be in complete running balance.

The formula by means of which the adjustment of weights 62 overcomes the unbalanced couple is indicated in Figure 32 and its application to the rotor and weights is indicated in Figures 28 to 31. The vector of the force produced by weights 62 is K and its radius is Z. E is the moment arm of force K about the pivot of bearing 11. B is one force of the couple (weight in ounces) and Y is the radius of B. A is the other force of the couple and X is its radius. G is the distance from the inner force A to the pivot point and H and F are each one-half the distance between A and B. Thus, magnitude of the force exerted by weights 62 is KZ at moment arm E and by adjusting the weights can be caused to equal the force produced by BY at lever arm $G+H+F$ less the force AX at lever arm G, or the force exerted by the couple and tending to oscillate the shaft about pivot 11.

With reference to Figures 34 and 35, we have illustrated a rotor of the type affected by air resistance upon rotation. This rotor is shown as being an aircraft propeller or air screw and is indicated by the reference character N. It will be understood that if such a rotor is rotated at high speed and any unbalance appears, two factors might be involved in such unbalanced condition, that is, weight unbalance and aerodynamic unbalance. To eliminate the latter factor in the balancing operations according to our method, we enclose the rotor N in a cylindrical housing 195. This housing 195 includes a removable closure 196 which may be attached to the main part of the housing by bolts 197. The housing 195 may be keyed to the shaft 9c for rotation therewith by a transverse bolt 198 extending through the hub 199 of the housing and through the shaft. It will be apparent that if the rotor N is mounted on the shaft in the previously described manner, the housing 195 is closed and the shaft is rotated, the only factor which will tend to produce oscillation of the shaft will be weight unbalance in rotor N, it being understood that the housing is perfectly balanced. The balancing operations can then be carried out in the previously described manner according to our invention.

It will be apparent from the above description that we have provided a novel method and apparatus for balancing a body to be rotated. According to our invention, a body can be balanced accurately and consistently at all speeds of rotation in such a manner as to overcome both radial and axial moments, that is, those unbalanced conditions which are referred to in the prior art as "static" and "dynamic" unbalances. With our method and machine, the rotor is balanced under conditions simulating actual running conditions to overcome both types of unbalance. The unbalanced conditions are overcome by introducing equal and opposite forces to the unbalanced forces in the rotor while it is being rotated. With our machine, the effect of "lag" between the instant of vibration and the indication of pickup of such vibration is eliminated because the rotor is not only tested while being rotated on our machine but is actually brought into balance during such rotation. With our machine, the rotor mounted thereon can be brought into balance with ease and accuracy. The machine is so simple and easy to operate that a highly skilled operator is not required and calibration by the operator is not required since the location and amount of weight correction necessary to bring the rotor into balance will be definitely indicated by instruments on the machine.

Various other advantages will be apparent from the drawings, the preceding description and the following claims.

Having thus described our invention, what we claim is:

1. The method of balancing a rotor which comprises rotating the rotor to be balanced about the axis upon which it is designed to rotate and causing such axis to oscillate freely, if the rotor is unbalanced, about a point spaced remotely axially from the rotor so as to cause unbalanced radial force only in the rotor to exert a substantial effect to produce such oscillation, bringing the rotor into single plane balance while rotating, as indicated by the decrease and ultimate ceasing of the oscillation of the axis of the rotor, by setting up a counterbalance force at a location axially between the said point and the said rotor but closely adjacent to the rotor and which acts in a plane at right angles to said axis and at an angular position around the axis, where it overcomes the said single plane unbalance, making the weight correction on the rotor, as indicated by the angular position and amount of the force, then, with the rotor supported in its original position, rotating it about its own axis again and causing such axis to oscillate freely, if unbalanced axial moments are present therein, about a point different from said first point and located axially between the said plane of said force and said rotor so as to cause the unbalanced axial moments only in the rotor to exert a substantial effect to produce such oscillation, bringing the rotor into couple balance while rotating, as indicated by the decrease and ultimate ceasing of the oscillation of the axis of the rotor, by varying the angular position of the counterbalance force in the same plane about such axis and its effective value so as to overcome said unbalanced axial moments, and finally making the weight correction on the rotor, as indicated by the adjusted angular position and amount of such force, thereby bringing the rotor into running balance.

2. The method of balancing a rotor which comprises rotating the rotor to be balanced about the axis upon which it is designed to rotate and causing such axis to oscillate freely, if the rotor is unbalanced, about a point spaced remotely axially from the rotor so as to cause unbalanced radial force only in the rotor to exert a substantial effect to produce such oscillation, bringing the rotor into single plane balance while rotating, as indicated by the decrease and ultimate ceasing of the oscillation of the axis of the rotor, by adjusting a plurality of radially acting counterbalance weights both relatively and as a unit about said axis in a plane at right angles to said axis which is located axially between the said point and the said rotor but closely adjacent to said rotor, to angular positions where they overcome the said single plane unbalance, making the weight correction on the rotor, as indicated by the adjusted angular positions and effective amount of the said weights; then, with the rotor supported in its original position, rotating it about its own axis again and causing such axis to oscillate freely, if unbalanced axial moments are present therein, about a point different from said first point and located axially between said plane of said weights and said rotor so as to cause the unbalanced axial moments only in the rotor to exert a substantial effect to produce such oscillation, bringing the rotor into couple balance while rotating, as indicated by the decrease and ultimate ceasing of the oscillation of the axis of the rotor, by varying the angular positions of the same counterbalance weights by adjusting the weights angularly both relatively and as a unit in the same plane about such axis to vary their effect so as to overcome said unbalanced axial moments, and finally making the weight correction on the rotor, as indicated by the adjusted angular position and effective amount of such weights thereby bringing the rotor into running balance.

3. Apparatus for balancing a rotor comprising a supporting structure, a shaft carried by said supporting structure, means for mounting the rotor on said shaft at a selected position axially thereof for rotation about the axis upon which it is designed to rotate and with such axis corresponding to that of the shaft, means for supporting said shaft on said supporting structure for selective oscillation, if the rotor mounted thereon is unbalanced, about two different points spaced axially along said shaft to one side of and different distances from said mounting means for the rotor, and a counterbalance weight unit supported on said shaft at an axial point between said points about which the shaft may oscillate for rotation with the shaft, said counterbalance weight unit including a counterbalance weight adjustable angularly about the axis of said shaft in a plane at right angles thereto.

4. Apparatus for balancing a rotor comprising a supporting structure, a shaft carried on said supporting structure, means for mounting the rotor on said shaft at a selected position axially thereof with the axis upon which it is designed to rotate corresponding to that of the shaft, means for supporting said shaft on said supporting structure for rotation and for selective oscillation, if the rotor mounted thereon is unbalanced, about two different points spaced axially along said shaft to one side of and different distances from said mounting means for the rotor, and a counterbalance weight unit supported on said shaft for rotation therewith at an axial point between said points about which the shaft may oscillate, said counterbalance weight including a plurality of weights angularly adjustable relative to each other and as a unit about the axis of said shaft in a plane at right angles thereto.

5. Apparatus according to claim 4 wherein the means for supporting said shaft includes means for confining the oscillation of said shaft in a single plane through the axis of the shaft.

6. Apparatus according to claim 5 including indicating means operatively connected to said adjustable weights for indicating the relatively adjusted angular positions of the weights, indicating means operatively connected to said weights to indicate the position of said weights as a unit about the axis of said shaft, and indicating means operatively connected to said shaft for picking up oscillation of said shaft when it is oscillating about either of said points.

7. Apparatus for balancing a rotor comprising a supporting structure, a shaft carried on said supporting structure, bearing units on said supporting structure spaced axially of the shaft for supporting said shaft for rotation about its axis, means for driving said shaft, means for mounting a rotor on the shaft with the axis upon which it is designed to rotate coinciding with that of the shaft for rotation therewith and located axially to one side of both of said bearing units, each of said bearing units including a pivot so that the shaft supported thereby can swing in the plane of its axis if the rotor mounted on the shaft is unbalanced, means carried by the supporting structure for selecting either of said bearings to permit swinging movement of the shaft about the pivot thereof, a plurality of counterbalance weights carried by said shaft in a single plane at right angles to the axis of the shaft for rotation therewith at a point axially between said bearing units, means carried by said shaft for adjusting said weights about said shaft angularly relative to each other in said plane, and additional means carried by said shaft for adjusting said weights as a unit about said shaft without disturbing their relative angular positions.

8. Apparatus according to claim 7 including indicating means operatively connected to said weight adjusting means for indicating the relatively adjusted angular positions of the weights, indicating means operatively connected to said weight adjusting means to indicate the position of said weights as a unit about the axis of said shaft, and means carried by the supporting structure at each of said bearings for picking up oscillation of said shaft when it is oscillating about either of said pivot points.

9. Apparatus for balancing a rotor comprising a supporting structure, a shaft carried on said supporting structure, bearing units on said supporting structure spaced axially of the shaft for supporting said shaft for rotation about its axis, means for driving said shaft, means for mounting a rotor on the shaft with the axis upon which it is designed to rotate coinciding with that of the shaft for rotation therewith and located axially to one side of both of said bearing units, each of said bearing units including a reciprocable member for supporting the shaft for bodily swinging movement in the plane of its axis if the rotor mounted on the shaft is unbalanced, locking means at each of said bearing units for locking said reciprocable member so as to prevent movement thereof, control means on the supporting structure for selectively actuating either of said locking means, each of said bearing units also including a bearing member which is pivoted to said reciprocable member, a plurality of counterbalance weights carried by said shaft for rotation therewith at a point axially between said bearing units, means carried by said shaft for adjusting said weights about said shaft angularly relative to each other in a single plane at right angles to said shaft, and additional means carried by said shaft for adjusting said weights as a unit about said shaft without disturbing their relative angular positions, both of said last-named means being operable during rotation of the shaft.

10. Apparatus according to claim 9 wherein said counterbalance weights are carried by arms extending radially from said shaft, and wherein said means adjusting said weights includes means for supporting said arms on the shaft for movement towards and away from each other and for movement as a unit about the shaft, means connected to said arms for adjusting said arms towards and away from each other, additional means connected to said arms for moving said arms as a unit about the shaft, and control means for operating both of said last-named means from a remote point on the supporting structure which is operable during rotation of the shaft.

11. Apparatus according to claim 10 comprising indicating means on the supporting structure operatively connected to said radially extending arms to indicate the relative positions of said arms.

12. Apparatus according to claim 11 comprising indicating means on the supporting structure operatively connected to said radially extending arms to indicate the position of said arms as a unit around said shaft.

13. Apparatus according to claim 12 comprising means carried by said supporting structure at each bearing unit for contact by said reciprocable supporting member for indicating when such member is reciprocating.

14. Apparatus according to claim 13 wherein a movable member is carried by the supporting structure at each bearing unit and is connected to said reciprocable member so that it will be moved thereby, and an indicator connected to said movable member for operation thereby for indicating the extent of movement of said reciprocable member.

15. Apparatus according to claim 14 wherein said indicating means operatively connected to said radial arms comprises a cam, means for supporting said cam on said shaft so that it is always disposed midway between said arms and for rotation with the shaft, and an indicator on said supporting structure actuated by said cam upon each revolution thereof with the shaft.

16. Apparatus according to claim 15 wherein the means for driving the shaft is adjustable to vary the speed of rotation thereof and means on said supporting structure connected to said shaft for indicating the speed of rotation of the shaft.

17. Apparatus for balancing a rotor comprising a base supporting a pair of spaced vertical standards, a shaft horizontally disposed and supported by a bearing unit mounted on each of said standards, means for driving said shaft and including an electric motor, means for clamping a rotor on said shaft for rotation therewith at a point to one side axially of both of said standards, each of said bearing units including a vertical pivot for supporting the shaft for horizontal pivoting movement in a horizontal plane through the axis of the shaft and a transversely and horizontally reciprocable plate carrying said pivot for supporting the shaft for bodily movement in said plane, a lock carried on each of said standards adjacent each of said reciprocable plates for locking each of said plates in fixed position on the standard, control means connected to said locks and supported by said standards for selectively controlling said locks, a pair of counterbalance weights carried by a pair of radial arms extending from said shaft in a transverse plane which is at right angles to said shaft and is located axially between said bearing units, means for supporting said arms on the shaft for rotation therewith, for movement towards and away from each other and for movement as a unit about the shaft, means on said shaft for adjusting said arms towards and away from each other, additional means on said shaft for moving said arms as a unit about the shaft, and control means for operating both of said last-named means from a remote point on the standards which is operable during rotation of the shaft.

18. Apparatus according to claim 17 including an electric circuit for controlling said motor and in which said motor is connected, a rheostat in said circuit supported by said standards for controlling the speed of the motor, and means supported by said standards and connected to said shaft for indicating such speed.

19. Apparatus according to claim 18 including a signalling circuit for indicating when each of the plates of the bearing units reciprocates, said circuits including contacts supported by the standards at said bearing units and actuated by the movement of each of said plates, and a flasher light connected in said signalling circuit and actuated by said contacts.

20. Apparatus according to claim 19 wherein an inductor is supported adjacent each of said plates and is operable thereby, said inductor comprising a core moved by the plate and a coil in which the core is disposed for movement, and a visible instrument connected in a circuit with said coil.

21. Apparatus according to claim 20 wherein said means for supporting said weight-carrying arms comprises relatively rotatable collars supported by a sleeve which is mounted on said shaft for rotation therewith, wherein said means for adjusting said arms towards and away from each other comprises means connected to said collars for producing relative rotation thereof to adjust the weight-carrying arms towards and away from each other, and wherein said additional means for moving said arms comprises means connected to said sleeve for causing it to rotate relative to the shaft to adjust said arms as a unit about the shaft.

22. Apparatus according to claim 21 wherein said supporting sleeve also carries a cam which is always disposed midway between said arms, said cam being rotatable with the sleeve when it is rotated to move said weight-supporting arms as a unit and being rotatable with the sleeve as it rotates with the shaft, contacts controlled by said cam, and a flasher light connected in a circuit with said contacts and actuated by said contacts.

23. Apparatus according to claim 22 wherein the flasher light actuated by said cam and the flasher light actuated by the movable bearing plates are in the form of circular tubes, one of which is disposed within the other for comparison.

24. Apparatus according to claim 23 including an indicating instrument supported by the standards, and means for operatively connecting said instrument to said relatively adjustable collars which angularly move said arms for indicating the angular positions of said weights.

25. A machine according to claim 24 including lights supported adjacent said rotor clamping means for projecting light beams on the rotor to indicate where the weight correction is to be made, circuits for said lights, a cam carried by the same sleeve which carries said first-named cam and being disposed in fixed relationship thereto, and movable contacts disposed adjacent said cam to be engaged thereby and connected in said light circuits.

26. A machine according to claim 25 wherein the lock adjacent each of said reciprocable plates of the bearing units comprises a solenoid connected in the electric circuit.

27. A machine according to claim 26 wherein a rotor guard is supported by the standard which is adjacent the clamping means for the rotor, said guard including a section movable between operative and inoperative positions, and a switch for said electric motor connected in the electric motor circuit and controlled by the position of said guard section.

CHARLES H. LINDENBERG.
THEODORE ONGARO.

REFERENCES CITED

The following references are of record in the file of this patent:

UNITED STATES PATENTS

| Number | Name | Date |
|---|---|---|
| 1,364,993 | Johnson | Jan. 11, 1921 |
| 1,364,994 | Johnson | Jan. 11, 1921 |
| 1,625,259 | Johnson | Apr. 19, 1927 |
| 1,876,526 | Thearle et al. | Sept. 6, 1932 |
| 2,067,892 | Cooper | Jan. 19, 1937 |
| 2,160,314 | Ongaro | May 30, 1939 |
| 2,186,339 | Moore | Jan. 9, 1940 |
| 2,196,031 | Schildmeier | Apr. 2, 1940 |
| 2,328,114 | Weaver et al. | Aug. 31, 1943 |
| 2,338,293 | Martin | Jan. 4, 1944 |

FOREIGN PATENTS

| Number | Country | Date |
|---|---|---|
| 551,785 | Great Britain | Mar. 10, 1943 |